United States Patent [19]

Becraft et al.

[11] Patent Number: 5,416,185

[45] Date of Patent: May 16, 1995

[54] PROCESS FOR EFFICIENT PHOSGENE USAGE IN THE PREPARATION OF POLYCARBONATES

[75] Inventors: Michael L. Becraft, Woodstock, Md.; David L. Ramsey, Mt. Vernon, Ind.

[73] Assignee: General Electric Company, Pittsfield, Mass.

[21] Appl. No.: 123,627

[22] Filed: Sep. 17, 1993

[51] Int. Cl.$^6$ .............................................. C08G 64/00
[52] U.S. Cl. .................................. 528/196; 528/198; 528/199
[58] Field of Search ..................... 528/196, 198, 199

[56] References Cited

U.S. PATENT DOCUMENTS 4,367,330  1/1983  Hucks et al. ...................... 528/196
5,011,966  8/1991  Silva et al. ........................ 528/198
5,043,203  4/1991  Fyvie et al. ....................... 528/198
5,300,624  4/1994  Boden et al. ...................... 528/199

*Primary Examiner*—John Kight, III
*Assistant Examiner*—Terressa M. Mosley

[57] ABSTRACT

A method for producing polycarbonates by the interfacial reaction of phosgene bisphenol in a two phase reaction medium of an aqueous hydroxide and an organic solvent is disclosed. In the reaction, the amount of water in the reaction medium is controlled such that high ionic strength conditions resulting from high salt concentrations are reached at the end of phosgenation and the pH of the medium is controlled to a range between 8 and 10 whereby excess phosgene usage is less than about 15% of theoretical conditions.

17 Claims, No Drawings

PROCESS FOR EFFICIENT PHOSGENE USAGE IN THE PREPARATION OF POLYCARBONATES

BACKGROUND OF THE INVENTION

Polycarbonates are commonly prepared by interfacial process in which phosgene is reacted with biphenols (e.g. bisphenol-A) using a two phase reaction medium of an aqueous solution (e.g. sodium hydroxide) and an organic solvent (e.g. methylene chloride). Optimum reaction conditions for rapid polymerization and high yield of polymer typically involve a pH value of the medium of about 10 to 11. Alkali salts are formed during the course of the reaction as phosgene is consumed. The reaction medium normally contains sufficient water to completely dissolve all salts to form a brine phase. Due to undesired side reactions, a portion of the phosgene is wasted and complete consumption of the biphenol typically requires phosgene usage in excess of 15 percent above stoichiometrically predicted amounts.

SUMMARY OF THE INVENTION

The present invention is based upon the discovery that in a process for producing polycarbonates, excess phosgene usage can be reduced from previous interfacial conditions by reducing the water volume in the reaction medium such that high ionic strength resulting from a high salt concentration is reached near the end of phosgenation, and by reducing the pH of the medium to a value between 8 and 10.

In one embodiment, the invention is directed to a method for producing polycarbonates by the interfacial reaction of phosgene ($COCl_2$) and bisphenol-A (BPA) in a two phase reaction medium including an aqueous hydroxide and an organic solvent wherein alkali salts are formed as phosgene is consumed. According to this embodiment, the method comprises the steps of:

providing an amount of water in the aqueous phase of the reaction medium such that high ionic strength resulting from a high salt concentration is reached at the end of phosgenation, and controlling the pH of the aqueous phase to a range from about 8 to about 10 near the end of the reaction. Specifically, it is preferred that the aqueous phase has a pH of about 9.0 during the last 30% of the reaction of the batch. The pH may be controlled by adding NaOH. Because the NaOH reacts with Cl from phosgene to produce NaCl and $H_2O$, it may be necessary to continuously add NaOH to control the desired pH. The other H+ comes from the OH⁻ group of Bis-Phenol A.

At a pH of about 9, or specifically 9, conditions appear to be optimal. The efficiency of phosgene usage, as measured by the level of residual hydroxy endgroups in the final polymer, is notably improved over conventional conditions. While comparable hydroxyl endgroup levels can occasionally be obtained from conventional conditions, the results according to the conditions of the present invention are consistent and reproducible.

Although a high salt concentration (e.g., greater than 230 gm/l) in the aqueous phase is achieved, any precipitated salts in the reaction medium can be redissolved by dilution with additional water prior to a recovery process.

The process has an immediate positive impact on productivity through economic savings realized from reduced phosgene usage. The discovery provides at least 5 percent reduction in phosgene usage over conventional interfacial conditions and can be implemented without equipment modifications or process changes. Productivity may also be further improved with an increase in batch sizes due to the reduced aqueous volume, with only a small modification in the recovery procedure to remove salts.

DESCRIPTION OF THE INVENTION

The invention is directed to a method for producing polycarbonates under conditions whereby excess phosgene usage is reduced to near stoichiometrically predicted amounts, for example, less than about 15% excess phosgene. Polycarbonates are produced by an interfacial process in which bisphenols and phosgene are reacted in a two phase reaction medium. The medium includes an inorganic caustic (e.g., an aqueous solution of NaOH at a concentration of about 30–50%) and an organic solvent (e.g., methylene chloride).

In the invention, the amount of water in the aqueous phase of the reaction medium is reduced such that a relatively high ionic strength and a high salt concentration (e.g., greater than 230gm/l) are reached near the end of the phosgenation (e.g., the last 30% of phosgenation). The pH of the medium is maintained in a range between about 8 and 10 near the end of the reaction. Also, reactions using a ramped pH setpoint starting at 11.5 and dropping to 9.5 during phosgenation show reduced phosgene hydrolysis and enables reaching completion with less phosgene when compared to similar reactions maintained at a pH of 10.5.

According to the invention, the pH, or OH⁻ concentration is controlled by the addition of NaOH to the batch. NaOH reacts with Cl⁻ from the phosgene to produce NaCl and $H_2O$. The OH⁻ group on the BPA supplies the hydrogen for the reaction. High ionic strength resulting from a NaCl concentration of about 230 gm/l or greater is preferred. The solution may be saturated with NaCl and any precipitated salts in the reaction medium can be redissolved by dilution with additional water prior to a recovery process.

The present inventors have discovered that interfacial reaction conditions using a pH of 9.0 and a reduction in aqueous volume to allow attainments of high salt concentrations show complete molecular weight builds and low levels of hydroxyl endgroups (near 10 ppm) at phosgene usages of 1.05 mol $COCl_2$/mol BPA. The low levels of hydroxyl endgroups indicate an almost complete reaction of the available phosgene. At similar phosgene totals, "control" reactions at pH 10.5 and original water levels show substantially higher concentrations of hydroxyl endgroups. The low pH and water volume conditions alter the partition coefficient of the triethylamine (TEA) catalyst over the course of reaction to produce progressively higher concentrations of triethylamine in the methylene chloride phase. The lower pH slows the kinetics of phosgene hydrolysis and favors the formation of stable chloroformate species. The reduced water volume produces high aqueous salt concentrations near the stoichiometric point of phosgenation (1.0 mol $COCl_2$/mol BPA), which results in higher organic phase TEA concentrations. Consequently, phosgene is more efficiently utilized and polymerization in the organic phase proceeds rapidly due to the presence of high TEA concentrations. High salt concentrations in the completed reactions are brought to lower levels by dilution with additional water to improve downstream recovery processes.

Data for the partitioning of triethylamine in the presence of high salt concentrations show increased concentrations of the catalyst in the organic phase. The relative concentrations of triethylamine between the organic and aqueous phases changed by a factor of ten between a salt-free system and one near the saturation point of NaCl. This measured change in the partioning of triethylamine due to salt concentration, when combined with the reduced hydrolysis of phosgene at low pH, has important implications for reduced phosgene usage in both the preferred interfacial process and other processes.

Reduced triethylamine concentrations (0.25 mol %) result in delayed and poor molecular weight builds with high residual phenol and BPA in the final polymers. The low triethylamine concentrations also contribute to increased phosgene hydrolysis as a consequence of slower condensation. Increased triethylamine concentrations (2 mol %) produce early molecular weight builds but with no measured improvements in the final polymer compared to normal reaction conditions.

Use of a mass flow meter on caustic feed to the reactor provides an accurate means for determining phosgene usage. Simple calculations for phosgene usage involve a two-to-one molar ratio of caustic to phosgene during chloroformate production and a four-to-one ratio for all excess caustic.

The following examples are presented by way of illustration and should not be considered as a limitation on the invention. In the examples below, phosgene usage is reported as a mole percent of the theoretical (i.e. stoichiometrically predicted) value when the reaction is completed. Ionic strength can be defined in terms of the salt concentration of the aqueous phase. For example, low salt concentration is defined as being in a range of between about 200 and about 220 grams NaCl per liter. High salt concentration is defined as being about 230 grams NaCl per liter, or greater. Control conditions are pH at 10.5 and low salt concentration. Measurement of BPA involves adjustment of the sample pH to a given value for consistent comparison conditions.

Table 1 is representative data for small scale batch reactions (e.g. 200 gal) where control reactions at a pH of 10.5 and low salt concentrations are compared to reactions at a pH of 9.0 and high salt concentrations. High salt conditions were achieved by using substantially reduced aqueous phase volumes. The free hydroxyl endgroups (free OH$^-$), which represent a measure of the completeness of reaction, are significantly lower for the low pH, high salt conditions compared to the control reactions. The data in Table 1 also show that carbonate concentrations increase more rapidly for the control conditions. This increase indicates a greater amount of phosgene hydrolysis by side reactions which represents waste in the process. The free OH$^-$ and carbonate differences result from the improvement in polymerization kinetics relative to the hydrolysis of phosgene. Further examples set forth and discussed below with respect to Table 5 show that at high aqueous salt concentrations, an amine catalyst used for the reaction partitions to a much greater extent into the organic phase. This in combination with a lower pH provides conditions under which the polymerization readily proceeds while phosgene hydrolysis is reduced.

TABLE 1

Small Scale Reactions Showing Efficiency Improvements

| Example | Conditions | Phosgene Usage | Free OH (ppm) | Carbonates (g/kg) |
|---|---|---|---|---|
| 1 | pH 10.5, low salt | 104 | 494 | None |
| 2 | pH 10.5, low salt | 103 | 548 | 4 |
| 3 | pH 10.5, low salt | 110 | 195 | 22 |
| 4 | pH 9.0, high salt | 103 | 10 | 5 |
| 5 | pH 9.0, high salt | 105 | 20 | 3 |
| 6 | pH 9.0, high salt | 113 | 12 | 7 |

Further supporting data for improved phosgene usage from small scale reactions are shown in Table 2. The data report aqueous bisphenol-A (BPA) concentrations of the two-phase solutions after polymerization in the final reaction. While both the control conditions and the low pH/high salt conditions show variability in the measured values, the average BPA concentration is considerably lower for the low pH/high salt conditions. The range of measured values for aqueous phase BPA in control reactions is quite substantial compared to the pH 9.0/high salt conditions. The technique for aqueous BPA measurements requires that samples be adjusted to a given pH prior to analysis for consistent comparisons.

TABLE 2

Aqueous Bisphenol-A Concentrations in Final Reaction Two-Phase Solutions

| Example | Conditions | Phosgene Usage | BPA (ppm) |
|---|---|---|---|
| 7 | Control | 104 | 59 |
| 8 | Control | 103 | 220 |
| 9 | Control | 110 | 70 |
| 10 | Control | 112 | 290 |
| 11 | Control | 112 | 104 |
| 12 | Control | 111 | 482 |
| 13 | Control | 109 | 17 |
| 14 | Control | 107 | 7523 |
| 15 | Control | 106 | 6212 |
| 16 | Control | 107 | 12 |
| 17 | Control | 119 | 78 |
| 18 | pH 9.0, high salt | 103 | 43 |
| 19 | pH 9.0, high salt | 105 | 91 |
| 20 | pH 9.0, high salt | 113 | 161 |
| 21 | pH 9.0, high salt | 109 | <10 |
| 22 | pH 9.0, high salt | 108 | <10 |
| 23 | pH 9.0, high salt | 109 | 87 |
| 24 | pH 9.0, high salt | 111 | 79 |
| 25 | pH 9.0, high salt | 110 | 71 |
| 26 | pH 9.0, high salt | 107 | 39 |
| 27 | pH 9.0, high salt | 107 | <10 |
| 28 | pH 9.0, high salt | 105 | 24 |
| 29 | pH 9.0, high salt | 109 | 17 |
| 30 | pH 9.0, high salt | 120 | <10 |
| 31 | pH 9.0, high salt | 113 | <10 |

*BPA technique involves adjustment of sample pH to a given value for consistent comparisons of conditions.

Experimental trials on a large scale (e.g. 5000 gal) have shown similar improvements in phosgene usage efficiency. Table 3 shows a sampling of large scale reactions. Data in Table 3 are reported as the mole percent of phosgene where complete polymerization was reached (i.e., molecular weight and intrinsic viscosity was at target and free OH$^-$ endgroups were consumed). Improvements in phosgene usage efficiency are clearly evident at the pH 9.0/high salt conditions.

TABLE 3

Manufacturing Scale Reactions

| Example | Conditions | Phosgene Usage |
| --- | --- | --- |
| 32 | Control | 115 |
| 33 | Control | 115 |
| 34 | pH 9.0, high salt | 108 |
| 35 | pH 9.0, high salt | 106 |
| 36 | pH 9.0, high salt | 109 |
| 37 | pH 9.0, high salt | 110 |

Reaction pH and aqueous salt concentration conditions combine to improve phosgene usage efficiency. Data in Table 4 illustrate the poor incorporation of BPA which results when conditions involve high aqueous salt concentration but no reduction in pH from the typical value of 10.5. The examples 38–40 in Table 4 show significant unreacted BPA at phosgene usages, especially when compared to examples 41–45 at lower pH.

TABLE 4

Effect of pH and High Salt on Phosgene Usage Efficiency

| Example | Conditions | Phosgene Usage | BPA (ppm) |
| --- | --- | --- | --- |
| 38 | pH 10.5, high salt | 109 | 3712 |
| 39 | pH 10.5, high salt | 108 | 4082 |
| 40 | pH 10.5, high salt | 109 | 3434 |
| 41 | pH 9.0, high salt | 109 | 1 |
| 42 | pH 9.0, high salt | 108 | 6 |
| 43 | pH 9.0, high salt | 109 | 87 |
| 44 | pH 8.0, high salt | 106 | 142 |
| 45 | pH 8.0, high salt | 106 | 67 |

Other data supporting the combined beneficial effects of pH and high salt concentrations on reaction efficiency are summarized in Table 5.

Interfacial reactions with delayed triethylamine catalyst addition show very dramatic delayed viscosity builds involving stable chloroformate (CF) species. Nearly twenty percent of the total phosgene can be tied up as chloroformates prior to catalyst addition. Higher concentrations of stable chloroformates are found to be produced in reactions with longer periods of low pH. The presence of chloroformates results in significant lags between calculated phosgene totals based on NaCl and phosgene meter readings. Calculated totals and meter readings are closer in agreement at the reaction endpoints where chloroformates are completely consumed.

Derivatized samples show OH/CF ratios that decrease with reaction time for different reaction types. During phosgenation, higher OH/CF ratios are obtained at lower pH. As phosgene totals increase, the OH/CF ratios decrease, and the rates of change of the OH/CF ratios are similar for reactions between 1.0 and 1.2 mol $COCl_2$/mol BPA. At 1.2 mol $COCl_2$/mol BPA (the phosgene setpoint for these reactions) the ratios decrease significantly during pH adjustments as OH$^-$ endgroups are consumed.

Low oligomer analyses show remarkably clean polymer from reactions using a pH ramp from 10.5 to 8.0 with TEA added up front. The pH ramp with TEA up front produces polymer with no detectable phenol and close to no detectable BPA, and full molecular weight build near 1.1 mol $COCl_2$/mol BPA. Reactions with both pH ramping and delayed TEA addition show extremely poor product with greater than 20% lows, a result attributable to increased hydrolysis of chloroformate endgroups and phosgene at the reduced TEA concentrations. Diphenyl carbonate (DPC) formation increases with decreasing reaction pH, with a more than twofold increase at pH 8.2 compared to pH 10.5.

Hydroxyl endgroup levels are lowest for reactions with pH ramping/TEA up front. For several samples from other reaction types, decomposition and significant generation of hydroxyl endgroups is noted during the overnight drying period for Fourier Transform Infrared sample preparation.

The examples in Table 5 utilized low salt concentrations at the pH conditions indicated and Examples 47 and 48 included a delayed addition of triethylamine (TEA) catalyst. The results show that a high pH (near 13.0) causes poor molecular weight build compared to pH conditions near a value of 10.5. This is explained by increased hydrolysis of phosgene at the higher pH. At low pH conditions (8.0–9.0), a slowed molecular weight build occurs, and the overall phosgene usage efficiency is worse than known conditions due to the sluggish polymerization kinetics. Removing some of the amine catalyst from the reaction, which has an equivalent effect to reducing the concentration of catalyst in the organic phase, also causes a delayed polymerization. The delayed polymerization is markedly enhanced when both the pH is low and amine catalyst concentration is reduced. These data, in combination with the results in Table 4, clearly show that pH values near 9 and the higher aqueous salt concentrations (i.e., greater than about 230 gm/l) are effective to result in phosgene usage efficiency improvements of the invention.

TABLE 5

Combined Effect of Delayed Catalyst Addition and pH

| Example | Conditions | Effect on Reaction |
| --- | --- | --- |
| 46 | pH 13.0, low salt | Incomplete polymerization |
| 47 | pH 9.0, low salt delayed catalyst addition | Delayed polymerization with typical levels of carbonates formed. |
| 48 | pH 8.2, low salt, delayed catalyst addition | Delayed polymerization, more so than at pH 9.0, with typical carbonates. |

While there has been described what at present are considered to be the preferred embodiments of the present invention, it will be readily apparent to those skilled in the art that various changes and modifications may be made therein without departing from the invention and it is intended in the appended claims to cover such changes and modifications as fall within the true spirit and scope of the invention.

What is claimed:

1. An improved method for producing polycarbonates by the interfacial reaction of phosgene and bisphenol in a two phase reaction medium one of which is an aqueous phase containing caustic and salt and the other of which is an organic phase containing solvent and triethylamine catalyst wherein alkali salts are formed as phosgene is reacted with bisphenol wherein the improvement comprises a) controlling the amount of water and the concentration of salt in the reaction medium to maintain in the aqueous phase a salt concentration of at least about 230 grams per liter, b) controlling the pH to a range from about 8 to about 10 near the end of the reaction, whereby the amount of phosgene required for complete polymerization is less than about 15% above stoichiometric conditions.

2. The method of claim 1, wherein the pH is about 9.

3. The method of claim 1, wherein the pH of the aqueous phase is controlled to be between 8 and 10 during the last 30% of the reaction.

4. The method of claim 3, wherein the pH of the aqueous phase is controlled to be about 9 during the last 30% of the reaction.

5. A method for producing polycarbonates by an interfacial reaction in which phosgene is reacted with a biphenol using a two phase reaction medium, said two phase reaction medium formed of an aqueous phase and an organic phase, comprising the steps of:
providing an amount of water in the aqueous phase and a concentration of salt such that near the end of phosgenation the concentration of salt in the aqueous phase is at least about 230 grams per liter and
controlling the pH of the aqueous phase at between 8 and 10 near the end of phosgenation.

6. The process according to claim 5, further comprising the step of reacting phosgene and biphenol to about completion.

7. The process according to claim 5, further comprising the step of recovering the reaction medium.

8. The process according to claim 5, further comprising the step of redissolving any precipitated salt in said reaction medium with water before said step of recovering the reaction medium.

9. The process according to claim 5, wherein said aqueous phase comprises an aqueous solution of sodium hydroxide (NaOH).

10. The process of according to claim 9, wherein the concentration of NaOH in said aqueous solution is about 30-50%.

11. The process according to claim 5, wherein said organic phase comprises methylene chloride.

12. The process according to claim 5, wherein said pH of the aqueous phase is controlled to be about 9.

13. The process according to claim 5, wherein said biphenol is bisphenol-A.

14. The process according to claim 5, wherein the amount of said phosgene is equal to or less than 109 percent of a stoichiometric amount predicted based on the amount of biphenol.

15. The process according to claim 5, wherein said biphenol is bisphenol-A and the amount of said phosgene is equal to or less than 109 percent of a stoichiometric amount predicted based on the amount of bisphenol-A.

16. The method according to claim 3, wherein the pH of the aqueous phase is controlled to be between 8 and 10 during the last 30% of the reaction.

17. The method according to claim 16, wherein the pH of the aqueous phase is controlled to be about 9 during the last 30% of the reaction.

* * * * *